United States Patent
Lewis et al.

(10) Patent No.: US 8,401,768 B2
(45) Date of Patent: Mar. 19, 2013

(54) SYSTEM AND METHOD FOR RESTARTING AN ENGINE

(75) Inventors: Donald J. Lewis, Vancouver, WA (US); Gopichandra Surnilla, West Bloomfield, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 584 days.

(21) Appl. No.: 12/552,068

(22) Filed: Sep. 1, 2009

(65) Prior Publication Data

US 2011/0054765 A1    Mar. 3, 2011

(51) Int. Cl.
*F02D 41/00* (2006.01)

(52) U.S. Cl. ........................................ 701/112; 701/113

(58) Field of Classification Search .......... 701/102–105, 701/112–115; 123/198 F, 198 DB, 198 D; 180/65.28; 477/3, 183, 185, 199, 200, 203–207, 477/209–211
See application file for complete search history.

(56) References Cited

U.S. PATENT DOCUMENTS

| | | | |
|---|---|---|---|
| 2,651,918 A * | 9/1953 | Kelley et al. ................ | 60/362 |
| 4,539,643 A | 9/1985 | Suzuki et al. | |
| 5,091,857 A * | 2/1992 | Katayama et al. ........... | 701/112 |
| 6,159,126 A * | 12/2000 | Oshidari ..................... | 476/10 |
| 6,190,284 B1 | 2/2001 | Kuroda et al. | |
| 6,334,834 B1 | 1/2002 | Mizutani et al. | |
| 6,344,834 B1 | 2/2002 | Josypenko | |
| 6,460,500 B1 | 10/2002 | Ooyama et al. | |
| 6,508,225 B1 * | 1/2003 | Hiki ............................ | 123/198 D |
| 6,647,938 B2 | 11/2003 | Gaessler et al. | |
| 6,736,099 B2 | 5/2004 | Mori et al. | |
| 6,760,655 B2 * | 7/2004 | Matsubara et al. .......... | 701/54 |
| 6,951,525 B2 | 10/2005 | Ries-Mueller | |
| 7,243,011 B2 | 7/2007 | Koenig et al. | |
| 7,316,631 B2 | 1/2008 | Tsunekawa | |
| 7,329,206 B2 | 2/2008 | Tanaka | |
| 7,341,035 B2 | 3/2008 | Kassner et al. | |

(Continued)

FOREIGN PATENT DOCUMENTS

| | | |
|---|---|---|
| EP | 1 069 346 A2 | 1/2001 |
| EP | 1 344 673 A2 | 9/2003 |

(Continued)

OTHER PUBLICATIONS

Lewis, Donald J. et al., "Method for Controlling an Engine During a Restart," U.S. Appl. No. 12/552,075, filed Sep. 1, 2009, 42 pages.

*Primary Examiner* — John T. Kwon
*Assistant Examiner* — Johnny Hoang
(74) *Attorney, Agent, or Firm* — Julia Voutyras; Alleman Hall McCoy Russell & Tuttle LLP

(57) ABSTRACT

Various systems and methods are described for controlling an engine in a vehicle, the engine being coupled to a transmission. One example method comprises, under selected braking conditions, shutting-off the engine and spinning-down the engine to rest while the vehicle is traveling, and in response to a foot-off-brake event, restarting the engine by at least partially engaging the transmission to assist in spinning-up of the engine from rest while the vehicle is traveling. In this manner, vehicle inertia can be used to assist in spinning-up the engine from rest when the vehicle is moving.

20 Claims, 6 Drawing Sheets

U.S. PATENT DOCUMENTS

| | | |
|---|---|---|
| 7,357,213 B2 | 4/2008 | Ji |
| 7,683,503 B2 | 3/2010 | Yamaguchi |
| 2003/0004635 A1* | 1/2003 | Kamiya et al. .............. 701/112 |
| 2005/0080523 A1* | 4/2005 | Bennett et al. ................ 701/22 |
| 2005/0133006 A1 | 6/2005 | Frenz et al. |
| 2006/0003866 A1* | 1/2006 | Unno et al. ..................... 477/44 |
| 2006/0030449 A1* | 2/2006 | Tsukada et al. ................ 477/3 |
| 2008/0051252 A1* | 2/2008 | Nishimura ..................... 477/92 |
| 2008/0103683 A1* | 5/2008 | Tabata et al. ................. 701/112 |
| 2008/0172161 A1* | 7/2008 | Kondo et al. .................. 701/66 |
| 2009/0063000 A1* | 3/2009 | Kodama et al. ................ 701/75 |
| 2011/0039657 A1 | 2/2011 | Gibson et al. |

FOREIGN PATENT DOCUMENTS

JP  2007239584  9/2007

* cited by examiner

SYSTEM AND METHOD FOR RESTARTING AN ENGINE

TECHNICAL FIELD

The present description relates generally to an internal combustion engine coupled to a transmission in a motor vehicle.

BACKGROUND AND SUMMARY

Vehicle engines may be configured to shut-off during idle conditions when the vehicle comes to a stop while a brake is applied and restarted once the brake is released (e.g., a stop/start system) in order to reduce fuel consumption. Fuel consumption may be further reduced by shutting down the engine during braking or by shutting down the engine when the operator is not braking and not requesting torque, before the vehicle has come to a stop.

One approach to shutdown and subsequently restart the engine while the vehicle is traveling is disclosed in U.S. Pat. No. 6,951,525. In the cited reference, the engine is restarted prior to a transition from free-wheel mode to engaged clutch travel mode by employing the fuel injection system using a charge regulator and/or an electric motor. In one embodiment the charge regulator reactivates the engine by sequentially activating a fuel injection system. In an alternative embodiment, engine restart may be supported by an electric motor. However, sequentially activating a fuel injection system to restart an engine is of little use in starting an engine that is not rotating because the injected charge may not be compressed so that it can be combusted and thereby restart the engine. And, starting an engine using a starter can interrupt other electrical systems since a large current may be required to restart the engine.

The inventors herein have recognized the above problems and have devised an approach to at least partially address them. Thus, a method for controlling an engine coupled to a transmission in a vehicle is disclosed. The method comprises, under selected conditions, shutting-off the engine and spinning-down the engine to rest while the vehicle is traveling, and, in response to an operating condition, restarting the engine by at least partially engaging the transmission to assist in spinning-up of the engine from rest while the vehicle is traveling.

Specifically, in one example embodiment when the vehicle is moving, a torque converter or another clutch is engaged when an engine restart is requested. Engaging the clutch transfers wheel torque to the at-rest engine so that the engine is rotated. An electric pump may be driven while the engine is at rest so that hydraulic pressure in the transmission is maintained during engine rest conditions. The transmission clutches can be shifted based on vehicle speed so that a desired amount of starting torque can be applied to start the engine (e.g., top gear reduces the resulting vehicle deceleration rate during a "push start"). In this manner, vehicle inertia can be used to assist in spinning-up the engine from rest when the vehicle is moving. Thus, fuel can be conserved by stopping the engine while engine torque is not required. And, the engine can be quickly restarted without having to engage the starter and draw current from the vehicle battery.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to a method for controlling an internal combustion engine coupled to a transmission in a motor vehicle. During selected conditions, including braking conditions in one example, an engine may be turned off and allowed to spin-down to rest while the vehicle is traveling. In one particular example, braking conditions include when a vehicle speed and/or an engine speed are below respective threshold values and coasting or engine stop conditions may include foot-off accelerator pedal conditions. As will be described below, in some embodiments, the transmission may be engaged and its gears able to shift while the engine is shutdown. In such a configuration, the transmission may be shifted before the engine is restarted based on the speed of the vehicle. As a result, the transmission may supply power to the engine, by way of the vehicle wheels, and assist in engine restarting. The transmission may provide torque to spinning-up the engine from rest in response to a condition, such as a foot-off-brake event. Thus, the engine can be restarted, at least under some conditions, using energy supplied from the moving vehicle.

Figure 1:
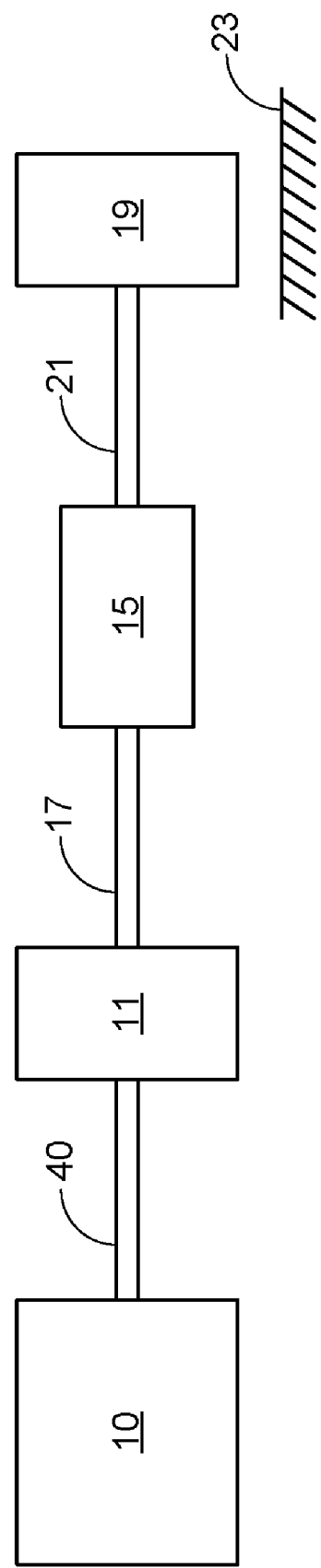
FIG. 1 shows a block diagram of a vehicle illustrating various powertrain components.
Figure 2:
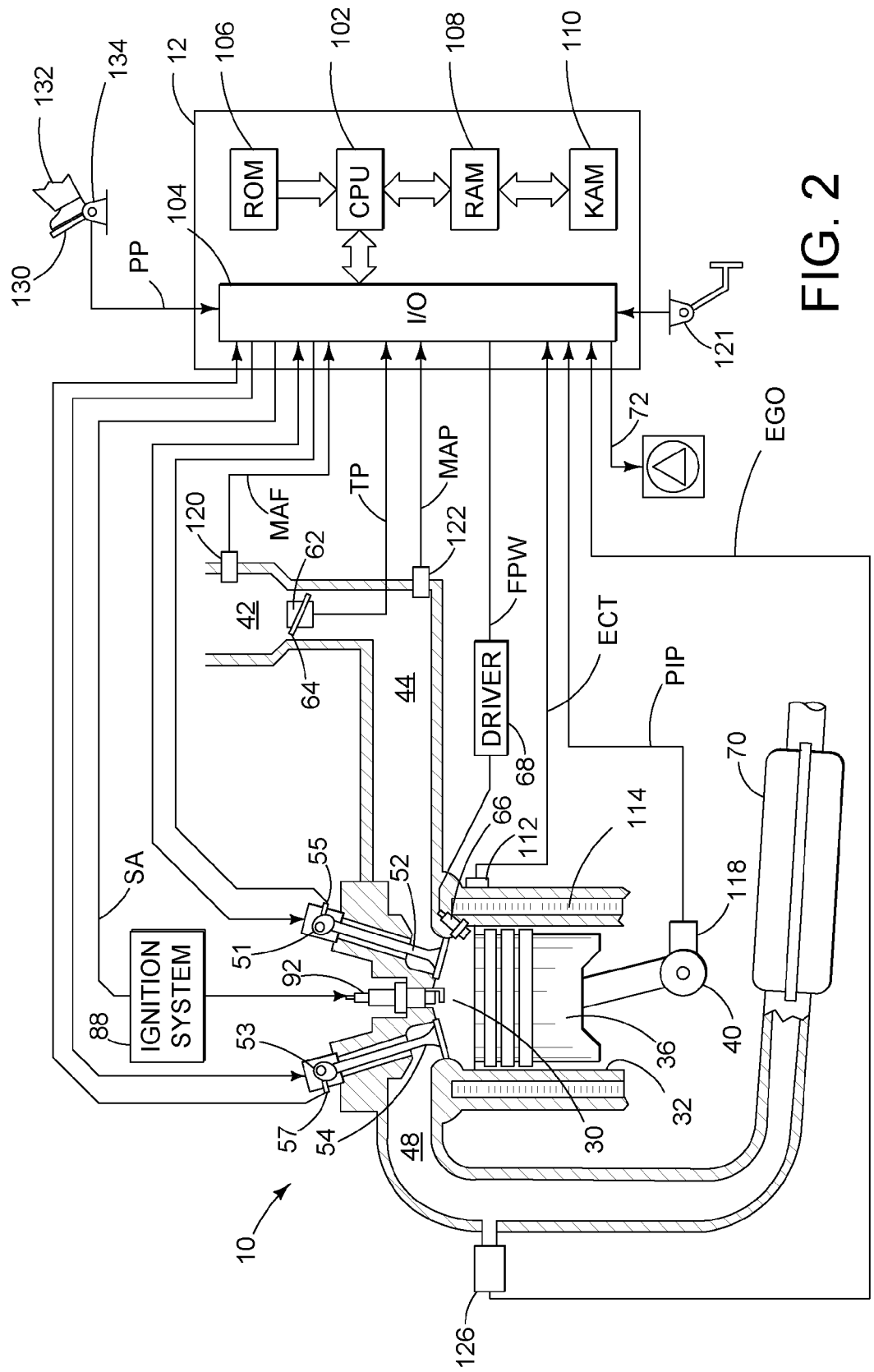
FIG. 2 shows schematic diagram of an engine.

Referring to FIG. 1, internal combustion engine 10, further described herein with particular reference to FIG. 2, is shown coupled to torque converter 11 via crankshaft 40. Torque converter 11 is also coupled to transmission 15 via turbine shaft 17. Torque converter 11 has a bypass clutch (not shown) which can be engaged, disengaged, or partially engaged. When the clutch is either disengaged or being disengaged, the torque converter is said to be in an unlocked state. Turbine shaft 17 is also known as transmission input shaft. In one embodiment, transmission 15 comprises an electronically controlled transmission with a plurality of selectable discrete gear ratios. Transmission 15 may also comprises various other gears, such as, for example, a final drive ratio (not shown). Alternatively, transmission 15 may be a continuously variable transmission (CVT).

Transmission 15 may further be coupled to tire 19 via axle 21. Tire 19 interfaces the vehicle (not shown) to the road 23. Note that in one example embodiment, this powertrain is coupled in a passenger vehicle that travels on the road. While various vehicle configurations may be used, in one example, the engine is the sole motive power source, and thus the vehicle is not a hybrid-electric, hybrid-plug-in, etc. In other embodiments, the method may be incorporated into a hybrid vehicle.

FIG. 2 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber 30 of engine 10 may include cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves. Exhaust camshaft 53 operates exhaust valve 54 in accordance with the profile of a cam located along the length of the exhaust camshaft. Intake camshaft 51 operates intake valve 52 in accordance with the profile of a cam located along the length of the camshaft. Exhaust cam position sensor 57 and intake cam position sensor 55 relay respective camshaft positions to controller 12. Pump 72 supplies oil to index intake camshaft 51 and exhaust camshaft 53 relative to crankshaft 40 based on commands to camshaft actuators (not shown) supplied by controller 12. Pump 72 may be electrically driven so that camshafts may be indexed when engine 10 is not rotating.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 2 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; vehicle brake 121; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

Controller 12 also receives signals from and provides control signals to a transmission (not shown). Transmission signals may include but are not limited to transmission input and output speeds, signals for regulating transmission line pressure (e.g., fluid pressure supplied to transmission clutches), and signals for controlling pressure supplied to clutches for actuating transmission gears.

As described above, FIG. 2 shows only one cylinder of a multi-cylinder engine, and that each cylinder may similarly include its own set of intake/exhaust valves, fuel injector, spark plug, etc.

Figure 3:
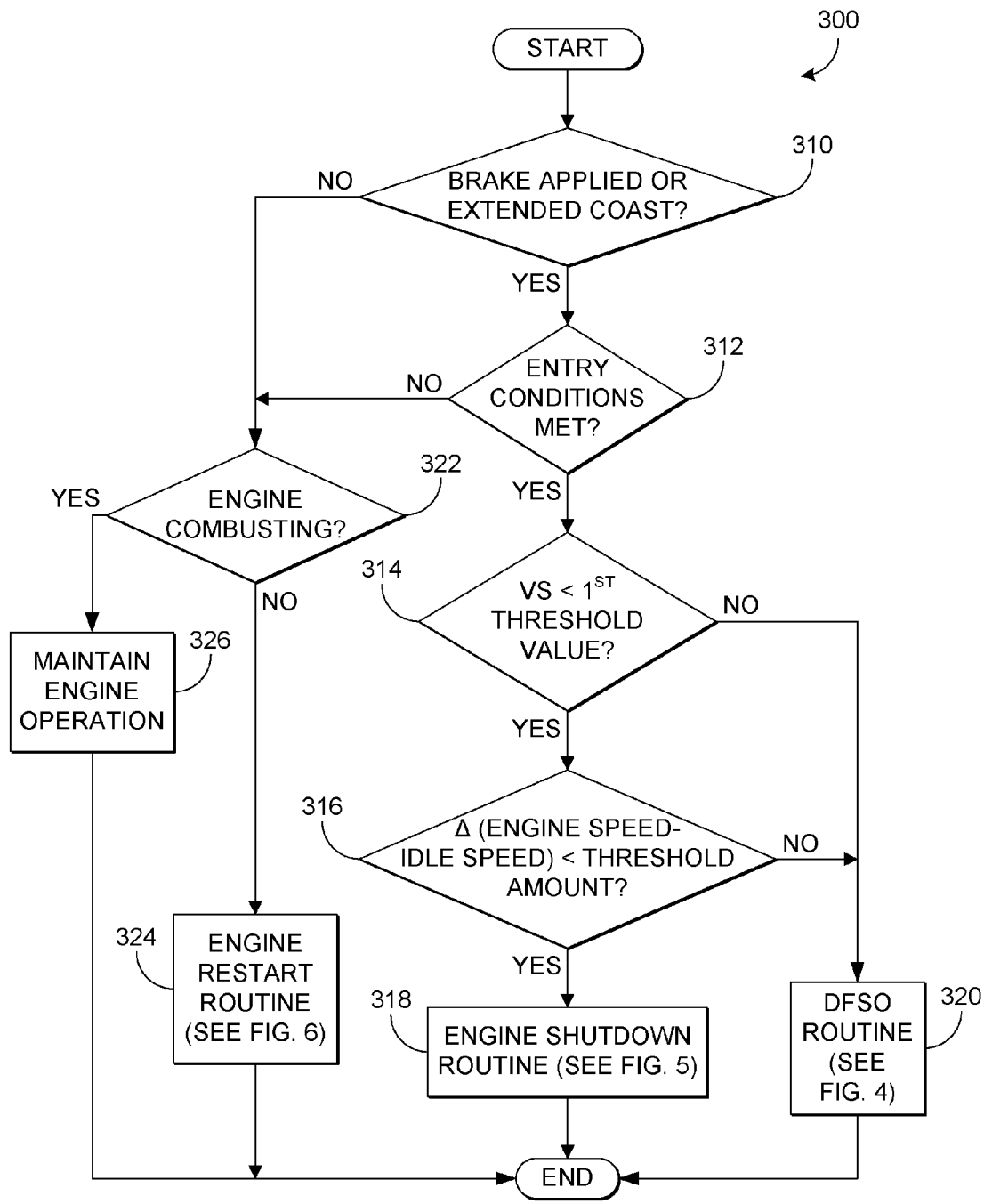
FIG. 3 shows a flow chart illustrating a control routine for an engine.

Control routines for engine 10 are illustrated in the flow charts of FIGS. 3-6. The flow chart in FIG. 3 depicts a routine for controlling an engine during various braking conditions. Depending on the braking conditions, the routine of FIG. 3 leads to the control routine of FIG. 4 or 5 in which the engine enters DFSO or the engine is shutdown, respectively. Finally, a routine for restarting the engine is displayed in FIG. 6.

Referring now to FIG. 3, the flow chart shows a control routine 300 for an engine, such as engine 10 in FIG. 2. Specifically, routine 300 determines conditions for which it is desirable to deactivate combustion in the engine during operation by a driver. In one example, under some conditions a fuel supply to the engine may be shut-off (with the engine continuing to rotate), while under other conditions the engine may be shutdown to substantially zero rotation (e.g., via discontinuing of spark, fuel supply, etc.). The routine allows the engine to restart when the driver demands torque or in response to other operating conditions.

At 310 of routine 300 in FIG. 3, it is determined if the engine should be stopped. In one example, if the brake is applied (e.g., if a driver's foot is depressing the brake pedal) the routine proceeds to 312. If the brake is not applied, or if the vehicle is not in an extended coast condition, routine 300 moves to 322 where the routine determines if engine combustion has been maintained. In another example, or in addition to utilizing the brake signal, the change in vehicle speed over a time or a change in vehicle speed over a vehicle distance traveled interval may be used to determine whether or not to deactivate combustion in the engine. A change in vehicle speed and lack of a driver demand torque may be used to indicate an extended vehicle coast period or an extended vehicle decent from altitude. Further, the driver torque demand can be used as an input to determine whether or not to deactivate combustion in the engine. Thus, each of the previously mentioned conditions and other conditions may be used to determine when to shut-down the engine.

At 312, the routine determines whether entry conditions are met. Entry conditions may include, but are not limited to, engine purging conditions, a charge state of a vehicle battery, engine temperature, emission control device temperature, etc. For example, the battery may be employed to run various components (e.g., electric motors, lights, etc.) while the engine is off; thus, the engine may not be shutdown unless the battery attains certain amount of charge.

If the appropriate entry conditions are met, routine 300 continues to 314 where it is determined if the vehicle speed (VS) is below a first threshold value. In the case in which it is determined that the vehicle speed is greater than the first threshold value, routine 300 moves to 320 where a deceleration fuel shut-off (DFSO) routine is initiated and a fuel supply to the engine is shut-off but the engine continues to rotate. The DFSO routine will be described in greater detail below with reference to FIG. 4.

Continuing with FIG. 3, if it is determined that the vehicle speed is less than the first threshold value, routine 300 proceeds to 316 where it is determined if the difference between the current engine speed and idle speed (Δ=engine speed-idle speed) is less than a threshold amount. If the difference between the current engine speed and idle speed is greater than the threshold amount, routine 300 moves to 320 where the DFSO routine is initiated. In contrast, if Δ (engine speed-idle speed) is less than the threshold amount, routine 300 continues to 318 where an engine shutdown routine is initiated, which will be described in detail below with reference to FIG. 5. Thus, one example, in response to a first braking condition (e.g., Δ<threshold), the routine shuts off a fuel supply to the engine while the engine continues to rotate, whereas in response to a second, different braking condition (e.g., Δ>threshold; the routine shuts-off the engine and the engine spins-down to rest.

In some embodiments, a single braking event may include both DFSO and shutting down the engine to rest, with the engine shut-down to rest occurring after operation in DFSO conditions. As an example, when the driver begins braking, the vehicle may be traveling at 70 mph and the difference between the engine speed and idle speed may be too high to shutdown the engine if a smooth restart is desired. As such, the fuel supply to the engine may be shut-off while the vehicle decelerates, with the engine continuing to rotate (e.g., during a first braking condition). During the same brake event (e.g., at a later time of the same operator brake event), the vehicle may slow to a speed of 40 mph (due to the extended braking by the operator) and the difference between the engine speed and idle speed may fall below the threshold amount allowing the engine to be turned off while the vehicle is traveling (e.g., during a second braking condition). As such, the engine is transitioned from continued rotation without fuel and spark, to a shut-down, engine rested, condition. The engine may be transitioned to a substantially zero rotation state by disengaging a transmission gear, for example, and/or placing the transmission into neutral. Thus, the engine can be decoupled from the transmission output, thereby reducing the torque supplied by the wheels to the engine through the transmission. Alternatively, the transmission may still be in gear, or shifted to a different gear, while a forward clutch is disabled to de-couple the transmission output from the engine. Such operation is described further with regard to FIGS. 4-5.

If, however, the vehicle speed and/or the Δ engine speed-idle speed do not fall below their respective threshold values, the routine may only employ DFSO operation during particular conditions.

In another embodiment, the vehicle speed and the difference between the current engine speed and idle speed may be below their respective threshold values and the routine may include only engine stopped operation during a particular engine deactivation sequence.

Figure 4:
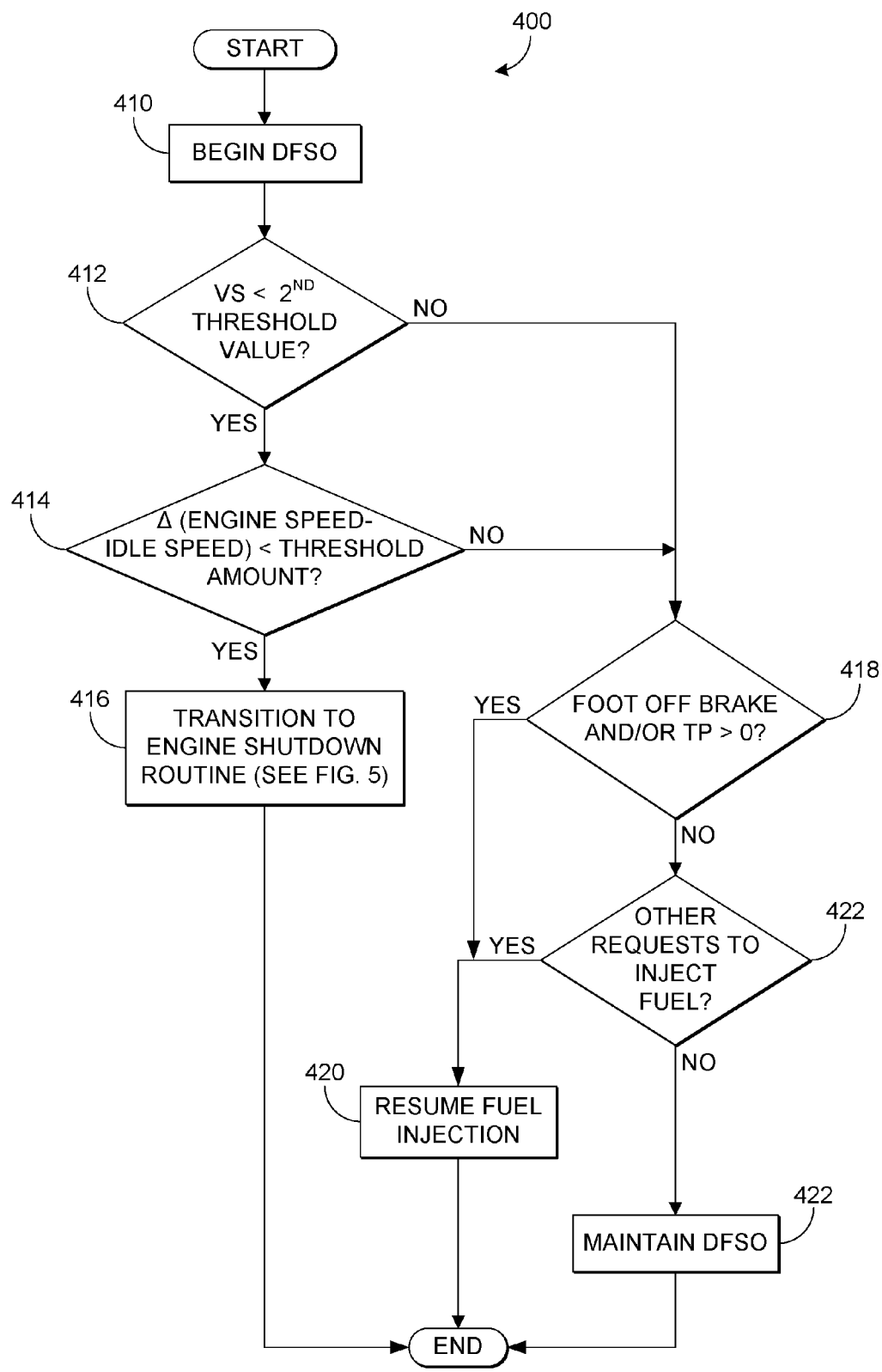
FIG. 4 shows a flow chart illustrating a control routine for an engine during deceleration fuel shut-off.

At 322, the routine determines if the engine is shut-down from a previous execution of the engine shutdown routine (FIG. 5) or from a previous execution of the DFSO routine (FIG. 4). If so, routine 300 proceeds to 324 and the engine restart routine is executed (FIG. 6), otherwise the routine maintains engine operation at 326.

Thus, routine 300 demonstrates how the engine will be controlled in response to various conditions while the vehicle is traveling. Depending on conditions such as vehicle speed and engine speed, routine 300 may transition to the routines of FIG. 4 and/or FIG. 5.

Turning now to FIG. 4, the flow chart in FIG. 4 depicts a control routine 400 for an engine during deceleration fuel shut-off (DFSO). Specifically, routine 400 determines conditions such as whether an operator is pressing a brake pedal, whether an automatic cruise control system is causing braking operation, and further including engine speed and vehicle speed once DFSO has begun. In response to the various conditions, the engine may be shutdown or DFSO may be maintained until fuel injection is resumed.

At 410 of routine 400, DFSO begins. Upon initiation of DFSO, fuel injection is cut-off to the cylinders. The engine continues to rotate, due to transmission of torque from the vehicle's wheel(s) to the engine through an engaged gear of the transmission, for example.

Once DFSO has begun, it is determined if the vehicle speed is less than a second threshold value at 412 of routine 400. If it is determined that the vehicle speed is less than the second threshold value, routine 400 proceeds to 414 where it is determined if the difference between the current engine speed and idle speed is less than a threshold amount. If the Δ engine speed-idle speed is less than the threshold amount, routine 400 continues to 416 where routine 400 transitions to the engine shutdown routine of FIG. 5. As described above in one example, during a single brake event, the engine shut-down operation may follow operation in DFSO when the vehicle speed and the Δ (engine speed-idle speed) decrease below respective threshold values. The transition may include changing a gear of the transmission to a neutral, and/or disengaging a transmission gear to reduce torque from the wheel delivered to the engine, thus reducing engine speed to rest.

On the other hand, if at 412 it is determined that the vehicle speed is greater than the second threshold value, routine 400 moves to 418 where it is determined if the driver's foot is off the brake and/or if the throttle position is greater than zero. Likewise, if it is determined that Δ (engine speed-idle speed) is not less than a threshold amount at 414, routine 400 moves to 418. In such a condition, only the DFSO operation may be performed in the single braking event.

In one example if it is determined that the driver's foot has released the brake and/or if the throttle position is greater than zero, routine 400 moves to 420 where fuel injection in one or more cylinders is resumed. If, instead, it is determined that the driver's foot is still on the brake and/or if the throttle position is zero, routine 400 proceeds to 422 where it is determined if there are other requests to inject fuel. For example, the temperature of an emission control device may need to be increased, and, in order to do so, the temperature of the exhaust gas may need to be increased. Thus, fuel injection may be resumed so as to increase the exhaust gas temperature, and in turn, the emission control device temperature. As another example, engine speed may fall below a minimum engine speed threshold, thereby generating a request to restart combustion in the already rotating engine. Other conditions such as vehicle speed below a predetermined amount may be substituted or added to the logic described above so that the DFSO logic proceeds to 418 and fuel injection is resumed, if desired.

Once it is determined there are no other requests to inject fuel, routine 400 proceeds to 422 where deceleration fuel shut-off is maintained and the routine ends, but may be subsequently re-executed.

In this manner, routine 400 controls engine operation in response to various conditions during deceleration fuel shut-off. In some embodiments, the routine maintains DFSO until fuel injection is requested or the brake is released. If the vehicle speed or the difference between the current engine speed and idle speed fall below their respective threshold values, routine 400 may transition to the routine of FIG. 5, even during a single braking event.

As illustrated, the routines of FIGS. 3-4 control both DFSO and engine shut-down operation, as well as transitions from DFSO to engine shut-down operation, during vehicle braking operation. In this way, it is possible to achieve rapid response to driver demands, while reducing oxygen flow through the catalyst system when possible.

Figure 5:
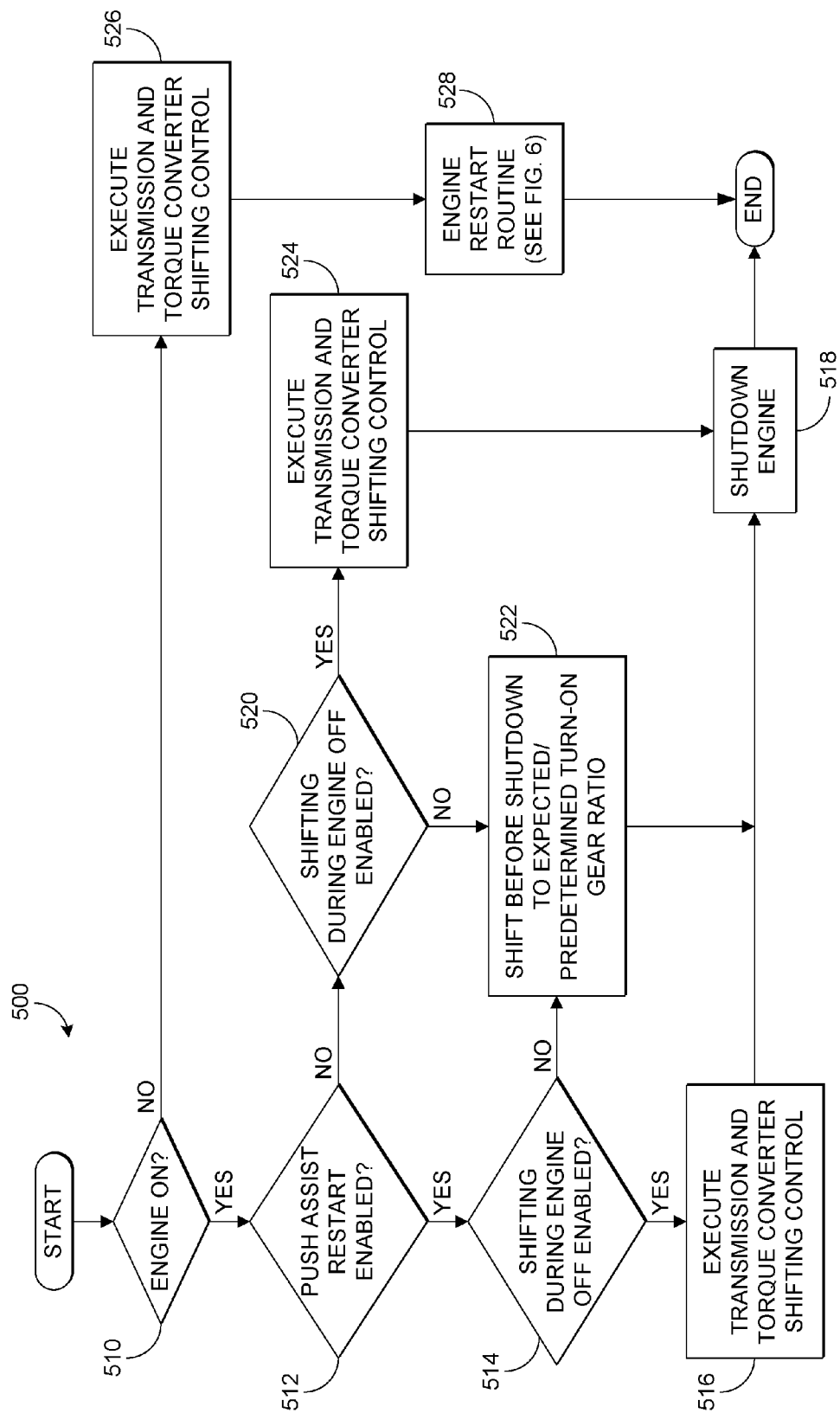
FIG. 5 shows a flow chart illustrating a control routine for shutting down an engine.

Referring now to FIG. 5, the flow chart illustrates a control routine 500 for shutting-down the engine in response to a condition such as a braking event or extended vehicle coast (e.g., a moving vehicle and substantially no operator torque demand). Specifically, routine 500 determines conditions for shutting down the engine and bringing engine speed down to rest, and controls the engine, transmission, and torque converter lock-up accordingly.

In one example, when the engine is operating in a DFSO mode and it is determined to shut-down the engine and bring the engine to rest, the routine first operates the transmission and/or torque converter to de-couple the engine from the driving torque of the wheels. For example, the transmission may have its forward clutch disengaged to maintain the transmission in gear, but decoupled the engine from the wheels to enable the engine to spin down to rest. In another example, the transmission may be shifted into neutral or a gear with an over-running clutch to de-couple the engine from the driving torque of the wheels and bring the engine to rest while the vehicle is still traveling. After the engine and transmission are decoupled, the engine goes to rest.

Alternatively, the engine may be shut-down from a combusting condition. Again, adjustment of the transmission may be used to bring the engine to rest by shifting gear, adjustment of the forward clutch, etc., as noted immediately above.

Additionally, the routine of FIG. 5 may further include adjustments to the transmission to configure the transmission to improve engine restarts. In the example where the transmission may be shifted during engine rest (e.g., via hydraulic pressure generated by an electrically driven pump), the gear of the transmission may be adjusted as the vehicle speed gradually reduces, so that as soon as an engine re-start request is issued, the transmission is in a desired gear to enable torque to be transferred from the wheels, through the transmission, thus at least partially push-starting the engine. In this example, the transmission may be transitioned to neutral (or a forward clutch disengaged) to spin the engine down to rest, and then shifted to fourth gear (with the forward clutch disengaged), for example, while vehicle speed is reduced from a first value to a second value, and then the transmission may be shifted to third gear (while the forward clutch is disengaged), for example, while vehicle speed is further reduced from the second value to a third value—all while the engine is shut down at rest and a braking condition is present. Then, in response to a release of the brake pedal, vehicle speed falling below a predetermined level, or another condition while in the third gear, the forward clutch can be engaged while initiating spark and fuel in the engine to restart the engine at least partially using the vehicle inertial. Further, during some conditions the starter may be engaged to assist the transmission to start the engine.

Note that a gear may be selected during the engine off period based on the available torque the gear would transfer from the tire back through to the engine. A transmission clutch or the torque converter clutch may be used to slip the gear such that all the torque available from the tire is not transferred to the motor. Slipping a transmission clutch or torque converter during engine run-up can reduce torque disturbances noticeable to the operator.

Note that restarting torque disturbances may be reduced by selecting a higher gear, quickly engaging a transmission clutch to rotate the engine above 200 RPM, de-clutching the transmission into neutral as the engine accelerates under its own torque provided by combustion, accelerate the engine to a speed synchronous with the transmission in a particular gear, and then re-engaging a transmission clutch. Thus, a smoother start may be accomplished by selecting a gear that is higher than the gear that would be selected by the transmission during similar driving conditions. Further, as an alternate embodiment, a mechanical one-way clutch may be used to link the transmission and the engine such that the engine may over run the transmission under some conditions. The mechanical clutch may be place in a configuration parallel with the engine torque converter if desired.

If the transmission is not shifted during engine rest conditions, then during or before the engine shut-down the transmission may be shifted to a desired gear for restarting. In this example, when transition from DFSO or combustion to an engine rest condition, the forward clutch may be disabled to de-couple the engine from the wheels (thus allowing the engine to spin down to rest), while at the same time the transmission is shifted to a desired gear (e.g., a high gear, such as a maximum gear) to enable improved engine restarting. Then, in response to a release of the brake, vehicle speed falling below a predetermined level, or another condition, the forward clutch may be engaged to utilize vehicle inertial to at least partially spin up the engine, along with commencement of fuel injection and spark to restart the engine.

At 510 of routine 500, it is determined if the engine is on, e.g., carrying out combustion, such as conditions in which air and/or fuel are injected to one or more cylinders of the engine and the engine is rotating. If it is determined that the engine is on at 510, routine 500 proceeds to 512 where it is determined if push assist restart is enabled. During push assist restart operation, the transmission may be utilized to at least partially assist in spinning-up the engine from rest while the vehicle is traveling during a subsequent restart condition (e.g., a foot-off-brake event), where this engine starting operation follows from conditions where the engine is shutdown due to conditions as described above.

If it is determined that push assist restart is enabled, routine 500 continues to 514 where it is determined if shifting during engine rest is enabled. Once it is determined that shifting during engine rest is enabled, routine 500 proceeds to 516 where a transmission and torque converter shifting control is executed.

In one example at 516, the transmission shifting and torque converter lock-up control can be carried out while the engine is off, such operation may be carried out to set the transmission and torque converter into a desired state for engine starting based upon the conditions of the engine start. For example, before the engine is shutdown, the transmission may be shifted to neutral, and while the engine is off the torque converter may be locked-up (e.g., engaged). As such, while the vehicle is traveling with the engine off, the transmission may shift into an appropriate gear with the forward clutch disengaged. Shifting the transmission while the engine is stopped allows for restarting the engine using a gear that will transmit sufficient torque from the vehicle wheels to at least assist engine starting. Further, the gear may be selected in response to vehicle speed and a desired amount of torque that is to be transferred from the vehicle wheels to the engine.

As one example, the transmission may be shifted from neutral to a high gear in order to "push start" the engine via the high gear and engagement of the forward clutch while reducing a torque dip that may be felt by the operator. In some embodiments, the push start may be pre-programmed to be executed by the controller during specific braking events, when vehicle speed is above a threshold, or during other conditions such as change in vehicle speed less than or greater than a threshold. In other embodiments, push start may be programmed to be executed during and in response to selected braking events, but not others.

At 516 routine 500 controls the transmission fluid pressure as well as the transmission clutches and the torque converter clutch. In one embodiment, the transmission fluid is pumped by an electrically driven pump when the engine is not rotating. The transmission fluid pump pressure can be controlled by controller 12, described in FIG. 2. The output of the electrically driven oil pump can be adjusted in response to ambient conditions (e.g., air temperature, air pressure, and the like) and in response to engine conditions (e.g., oil temperature). In one example, the line pressure supplied to clutches in the transmission can be controlled during engine stop by sending a command current or modulated voltage signal to a pressure regulating valve located within the transmission. Similarly, transmission clutches can be engaged or disengaged by a command current or modulated voltage signal sent to the transmission clutches. Further, clutch slippage can be controlled by monitoring the transmission input and output shaft speeds and then adjusting the demand current or duty cycle applied to valves that regulate the transmission fluid pressure that is applied to the clutches. The torque converter clutch may also be controlled by supplying the clutch actuator a command current or modulated voltage. Note that the torque converter clutch may be an application specific design that is used to restart the engine from rest. If so, separate control for two torque converter clutches may be provided.

From the transmission and torque converter shifting control, the routine continues to 518 to shut-down the engine. Herein, shutting down the engine includes shutting-off the engine and spinning-down the engine to rest, e.g., by de-coupling the engine from the transmission output/wheels and/or stopping fuel injection/spark. As described above, depending on conditions, the engine may be shutdown to rest while the vehicle is traveling. In one example, the engine intake and exhaust cams are indexed to a position that reduces air flow through the cylinders while the engine is at rest. The intake and/or exhaust cams may be indexed when the engine is spinning-down or when the engine is at rest. By adjusting the camshafts to positions that reduce flow, convective flow through the engine and exhaust system can be reduced thereby limiting oxygen flow through the engine while the engine is at rest. Similarly, the engine throttle can be closed to reduce flow through the engine while the engine is at rest.

At 518 engine oil pressure is also controlled while the engine is at rest. In one embodiment, an electrical pump can be controlled by controller 12, described in FIG. 2. The output of the electrically driven oil pump can be adjusted in response to ambient conditions (e.g., air temperature, air pressure, and the like) and in response to engine conditions (e.g., oil temperature).

Referring back to 512 of routine 500 in FIG. 5, if it is determined that push assist restart is not enabled, routine 500 moves to 520 where it is determined if shifting during engine off is enabled. As above, if shifting during engine off is enabled, routine 500 moves to 524 where a transmission and torque converter shifting control is executed. In contrast to the above scenario, however, in this case, the transmission is shifted during engine off conditions in order to provide a smooth restart where the transmission may provide an appropriate amount of torque to the engine in order to quickly apply power and spin-up the engine from rest at restart. For example, the transmission may be shifted from neutral to a low gear to increase torque at restart. Similar to the previous scenario, once the shifting control is executed, routine 500 moves to 518 and the engine is shutdown and the routine ends.

On the other hand, in either case, if it is determined at 514 or 520 that shifting during engine off is not enabled, routine 500 proceeds to 522. At 522 of routine 500, the transmission is shifted before shutdown to a gear appropriate for an expected/predetermined engine turn-on speed. After the transmission is shifted, routine 500 moves to 518 where the engine is shutdown and the routine ends.

Referring back to 510 of routine 500 in FIG. 5, if it is determined that the engine is not on (e.g., the engine is off), routine 500 moves to 526 where transmission and torque converter shifting control is executed based on the vehicle speed, as described in the above examples. Note that the transmission may be placed in neutral for engine starts when the starter is used to start the engine and when vehicle speed is substantially zero.

Figure 6:
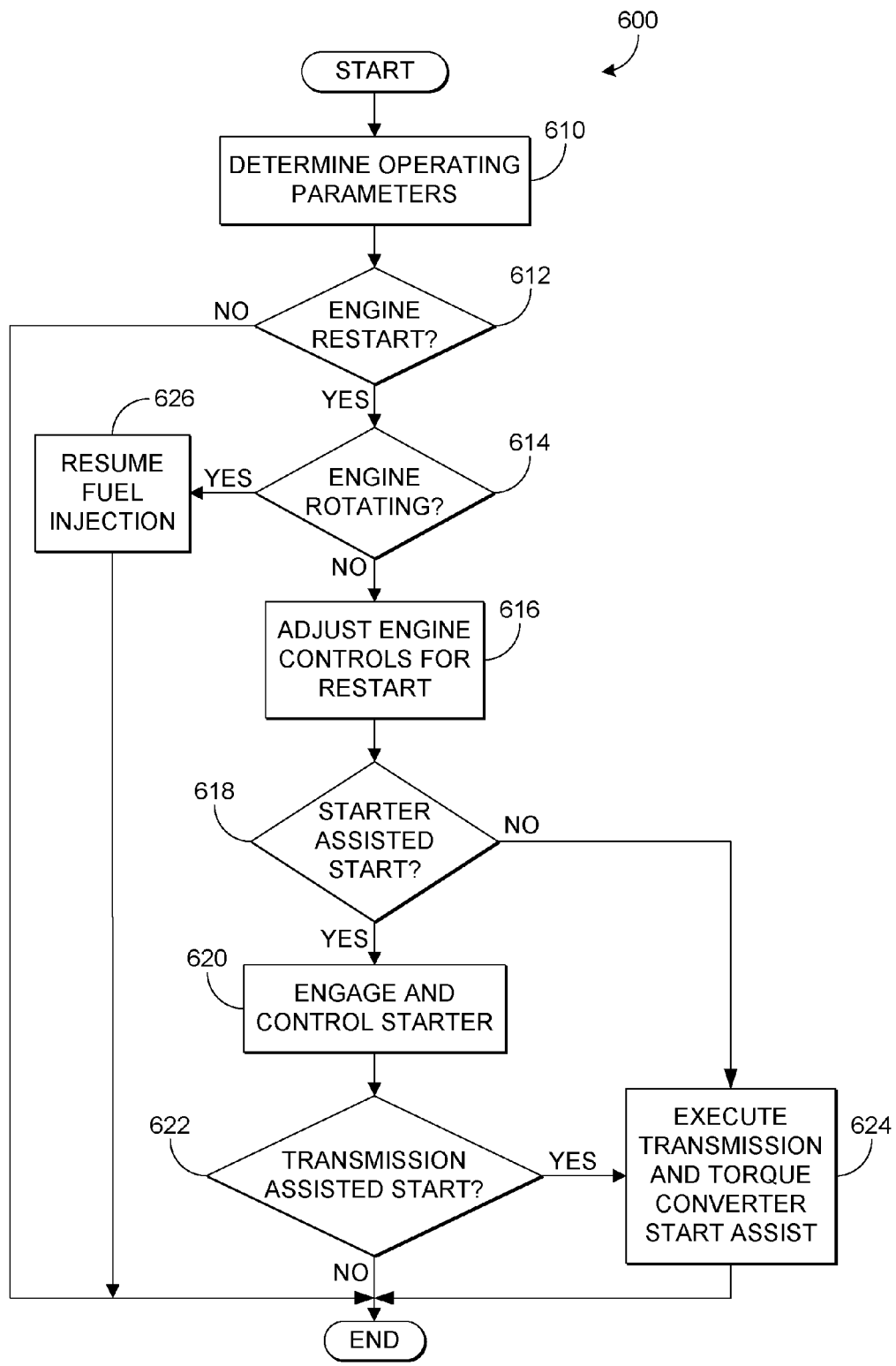
FIG. 6 shows a flow chart illustrating a control routine for restarting an engine.

Once the shifting control is executed at 526, routine 500 continues to 528 where the engine restart routing of FIG. 6 is executed. The restart routine will be described in greater detail below with reference to FIG. 6.

As demonstrated by the flow chart of FIG. 5, routine 500 controls the manner in which the engine is shutdown. Depending on the functions that are enabled by the controller, the transmission may shift to a desired gear before the engine is shutdown or the transmission may shift to a desired gear while the engine is off.

Finally, the flow chart in FIG. 6 illustrates a control routine for subsequently restarting the engine while the vehicle is traveling after the engine is shutdown or if the vehicle comes to a complete stop. Specifically, routine 600 decides whether or not to restart the engine in response to operating conditions. If an engine restart is desired, the engine may be restarted solely by an engine starter, by using vehicle inertia (so long as vehicle speed is above a threshold), or by a combination of the two (so long as vehicle speed is above a threshold). The engine restart may be initiated by a throttle or torque demand, by a change in vehicle speed, by vehicle speed that is above or below a threshold, by a change in brake position, or by other conditions. In response to conditions that initiate a restart, the engine may be set for restart. For example, the engine throttle and cams may be positioned so that a desired engine torque is produced when combustion is reinitiated in the engine cylinders. In another example, fuel may be injected directly into cylinders so that combustion can be initiated by a spark to shorten or improve the engine restart.

At 610 of routine 600, operating parameters are determined. For example, vehicle speed, change in brake position, a foot-off-brake event (e.g., the operator releases the brake), change in vehicle speed, engine temperature, engine aftertreatment device temperature, and other conditions. Further, combinations or sub-combinations of these and other parameters may be determined if desired. Next, the routine proceeds to 612 where it is determined whether or not to restart the engine. If an engine restart is desired the routine proceeds to 614. If not, the routine exits.

Numerous embodiments are anticipated under which different conditions are used to determine whether or not the engine is restarted. In one embodiment, an engine restart is initiated when the vehicle speed is below a first threshold and above a second threshold. In this embodiment, the first and second thresholds are used to define a vehicle speed range in which the vehicle inertia may be used to at least assist engine restart. In another embodiment, the brake position (e.g., the position of the vehicle brake pedal) and vehicle speed may be used to determine when to restart the engine. For example, if the operator's foot remains on the brake, an engine at rest may stay at rest until the vehicle stops and the operator removes his or her foot from the brake. Further, the change in position of the brake pedal (e.g., the brake pedal is repositioned) may be used to initiate an engine start. In another embodiment, an engine restart may be initiated when the change in vehicle speed is below a threshold amount. For example, if the operator's foot is off the brake and the vehicle is slowing because the road grade is changing, the engine may be restarted. Further, different signals and combinations of signals may be used to determine when to restart the engine at 612.

At 614, routine 600 determines if the engine is rotating. If the engine is rotating, the routine proceeds to 626 where fuel injection, spark, and combustion are resumed. If the engine is not rotating the routine proceeds to 616.

At 616 engine controls are adjusted for restarting the engine. In particular, fuel timing, position of cams, spark timing (advance/retard), fuel injection location of start of injection, fuel injection amount, fuel injection pressure, and throttle position may be adjusted to improve engine start. Further, combinations or sub-combinations of these and other parameters may be adjusted during or in anticipation of an engine start.

In one embodiment, as described above, fuel may be directly injected to a cylinder before engine rotation so as to assist in engine rotation when a spark is output to combust the injected fuel. Further, the fuel timing may be advanced or retarded relative to crankshaft angle at which fuel was delivered to the engine prior to last engine stop.

In another embodiment, the throttle angle may be set so that a controlled amount of air enters the cylinder during engine restart. By controlling the amount of air entering the cylinder at start, engine torque and emissions may be changed. Further, as mentioned above, the position of the intake and/or exhaust cams may be adjusted during an engine start. By indexing the cams further control over cylinder air charge and residuals may be provided. For example, in one embodiment, the cams may be adjusted to lower engine pumping work so that the engine can be rotated by less torque. In this example, the cams can be further adjusted so that the amount of residuals is increased or decreased as combustion is initiated.

If the vehicle is moving the engine control parameters mentioned above may be set in relation to vehicle speed. For example, cam timing, throttle position, fuel start of injection, fuel timing, and spark angle may be adjusted such that the amount of torque generated by the engine at restart of the moving vehicle is at or slightly below the torque required to keep the vehicle moving at the present vehicle speed. In one embodiment, a road load may be determined at a particular vehicle speed, and a desired engine torque may then be determined from the road load. As a result, the engine can be restarted such that the vehicle speed does not surge or decay from a threshold vehicle speed. In another embodiment, the engine may be restarted by adjusting one or more of the previously described engine control parameters to a first position or demand at start, and then shortly after start or during engine run-up, to a second position or demand that is related to vehicle speed. Thus, operation of the engine can be controlled in relation to the vehicle so that smooth transitions between operating the vehicle without the engine and operating the vehicle with the engine can occur.

In addition, throttle may be adjusted responsive to an operator demand at the time of engine restart. Thus, engine torque during start can be adjusted after road load torque is met. Routine 600 moves from 616 to 618 after engine controls have been adjusted.

In one embodiment, when more push starting torque (e.g., more torque is provided from the vehicle wheels to the engine by way of the transmission) is provided by the transmission than torque provided by the starter, the throttle may be set at a first position that is more closed than when the engine is started using less push starting torque provided by the transmission as compared to the starting torque provided by the starter. In this example, cam timing can be retarded, spark retarded, and the fuel injection start of injection time can be retarded in order to further reduce engine torque during the engine restart.

In one embodiment, when less push starting torque is provided by the transmission than torque provided by the starter, the throttle may be set at a second position that is more open than when the engine is started using more push starting torque provided by the transmission as compared to the starting torque provided by the starter. In this example, cam timing can be advanced, spark advanced, and the fuel injection start of injection time can be advanced in order to further reduce engine torque during the engine restart.

It should be noted that particular engine controls adjustments may be made before or after it is determined whether the transmission or starter or a combination thereof will be used to start the engine. As such, the order of execution describe by FIG. 6 may be varied.

At 618, the routine decides whether or not to use the starter to start or assist starting of the engine. Parameters determined at 610 may be evaluated in combinations and sub-combinations to determine whether or not to start or assist the start of the engine using a starter.

In one example, if the vehicle speed is substantially zero, the starter is used to start the engine, but if the vehicle speed is above a threshold, the engine may be started by torque from the transmission or by the starter, or by a combination of the starter and the transmission. For example, the starter may be used to start the engine when the vehicle is moving and when vehicle speed is less than a first threshold value. If the vehicle speed is greater than the first threshold value, but less than a second threshold value, the starter may be used in combination with the transmission to start the engine. And, if the vehicle speed is above the second threshold value, the transmission may be the source of engine starting torque.

In another example, the vehicle speed may not go to substantially zero without starting the engine using transmission torque. In still another example, the starter may be used to start the engine under all conditions while the transmission is used to start the engine, assisting the starter, when vehicle speed is greater than a threshold. If a starter assisted engine start is desired, routine 600 proceeds to 620. If not, routine 600 proceeds to 624.

At 620, the routine engages the starter to start the engine. In one embodiment, the starter pinion is engaged when the engine is running-down to substantially zero speed. The starter pinion remains engaged until the engine is restarted. In this example, current to rotate the starter is sent to the starter after starter assistance is requested, otherwise the pinion can be withdrawn from the flywheel before transmission torque is applied to the engine. Current to rotate the starter may be maintained until the engine reaches a threshold speed. Routine 600 then proceeds to 622.

At 622, routine 600 determines whether or not to assist the starter in the engine start. As mentioned above, in one example, the transmission may assist the starter when vehicle speed is greater than a first threshold and less than a second threshold. If the transmission is assisting in the engine start, routine 600 proceeds to 624. If not, the starter rotates the engine while spark and fuel are activated and the engine is started. Routine 600 exits when the engine is started.

At 624, the transmission is controlled to provide torque to start the engine. As mentioned above, the transmission may solely supply rotational torque to the engine during an engine start, or the transmission may supply a fraction of torque to start the engine.

In routine 600, the starter is engaged and current may be controlled to rotate the starter motor before transmission applies torque to the engine. But in other embodiments, torque may be provided to start the engine by way of the transmission before the starter applies torque to the engine. Thus, the order and timing of applying starter torque and/or engine torque to start the engine can be modified for different conditions and objectives.

In an embodiment where the starter supplies torque to the engine before the transmission, the engine may begin to rotate before the transmission clutch is applied. Under some conditions, the torque converter clutch may be applied before the transmission forward clutch or gear clutch is applied. Under other conditions, the torque converter clutch may be applied after the transmission forward clutch or gear clutch is applied. When the transmission torque is applied with the starter torque, the transmission clutches may be applied at an empirically determined rate that is based on a table or function stored in memory.

In another embodiment, torque may be applied to start the engine solely by the transmission. In this embodiment, a transmission clutch (e.g., converter clutch, forward clutch, or gear clutch) is engaged according to a function that relates vehicle speed and current gear selected. The function contains a clutch apply command profile that is used to output a duty cycle or current command to regulate the force that is applied to the clutch. Alternatively, the a function that is indexed by time since application of duty cycle, vehicle speed, and current gear selected may be used to command the transmission clutches during a transmission assisted engine start. In this way, the clutch apply profile allows the transmission clutch to slip for a portion of the clutch apply period so that there is not an abrupt change in torque that may be objectionable to the operator.

In another embodiment, a clutch apply profile based on vehicle speed and current gear selected is modified in response to the transmission input side shaft speed (e.g., the side of the transmission that mates to the engine) and the transmission output side shaft speed (e.g., the side of the transmission that mates to the driveline and tires). The input and output speeds are compared to determine an amount of slip. The determined slip is then compared to a desired amount of slip and an error term is then created. The error is added to the output of the clutch apply profile to correct the clutch apply command. When the transmission input speed multiplied by the gear ratio substantially matches the transmission output speed, the clutch is engaged and the routine proceeds from 624 to end.

Thus, in some embodiments, engine restart while the vehicle is traveling may occur after the transmission has been shifted to a desired gear based on the vehicle speed. In this manner, the transmission may be utilized to spin-up the engine quickly after the engine has been shutdown in response to the above described braking conditions.

Note that threshold values described in FIG. 4-6 may be varied under different operating conditions. For example, if the time since engine start is short or if a temperature of an exhaust after treatment device is near a particular temperature, the engine speed threshold at which DFSO is entered may be increased or decreased.

Further note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for controlling an engine coupled to a transmission in a vehicle comprising:
    under a first operating condition, shutting-off the engine and spinning-down the engine to rest while the vehicle is traveling; and
    in response to a second operating condition, restarting the engine by at least partially engaging the transmission and transferring wheel torque through the transmission to the at-rest engine to assist in spinning-up the engine from rest while the vehicle is traveling.

2. The method of claim 1, wherein the transmission is shifted to neutral before the engine is shut-off.

3. The method of claim 2, wherein a torque converter is engaged during engine rest conditions.

4. The method of claim 2, wherein a pump is driven during at least engine rest conditions to maintain pressure of a fluid.

5. The method of claim 4, wherein the pump is driven by an electric motor during engine rest conditions.

6. The method of claim 1, wherein transferring wheel torque through the transmission to the at-rest engine includes applying a clutch to engage a gear in the transmission.

7. The method of claim 6, wherein the gear is selected based on a speed of the vehicle during or after the second operating condition.

8. The method of claim 1, wherein the first operating condition includes application of a brake and vehicle speed below a threshold value.

9. The method of claim 1, wherein the second operating condition includes a change in position of a brake pedal.

10. A method for an engine in a vehicle, the engine being coupled to a transmission, the method comprising:
    in response to a first operating condition, shutting off a fuel supply to the engine;
    in response to a second operating condition, shutting off the engine and spinning-down the engine to rest; and
    during or before engine rest conditions, transferring wheel torque through the transmission to the engine by shifting a gear of the transmission depending on a desired speed of the engine at a third operating condition.

11. The method of claim 10, wherein shutting off the fuel supply to the engine includes deceleration fuel shut-off.

12. The method of claim 10, wherein the vehicle is traveling during engine rest conditions and the third operating condition is a change in a position of a brake pedal.

13. The method of claim 12, further comprising a braking event that includes the first operating condition and the second operating condition, and the second operating condition follows the first operating condition.

14. The method of claim 12, further comprising a braking event including only the second operating condition when a vehicle speed is below a first threshold value when the brake pedal is repositioned.

15. The method of claim 14, wherein the second operating condition includes when a vehicle speed decreases below a second threshold value during the first operating condition.

16. The method of claim 15, wherein the second operating condition further includes a difference in current engine speed and an idle speed of the engine less than a threshold amount.

17. The method of claim 14, wherein the braking event includes only the first operating condition when the vehicle speed does not decrease below the first threshold value before a subsequent foot-off-brake event.

18. The method of claim 12, wherein during engine rest conditions, a pump is driven to maintain pressure of a fluid.

19. The method of claim 12, wherein a desired speed of the engine at a subsequent change in brake pedal position is based on a vehicle speed during the change in brake pedal position.

20. A system for an engine in a vehicle, the system comprising:
    an automatic transmission having a plurality of gear ratios;
    the engine coupled to the transmission via a torque converter; and
    a control system configured to:
        shut-off a fuel supply to the engine responsive to a first operating condition;
        shut-off the engine and spin-down the engine to rest while the vehicle is traveling responsive to a second operating condition;
        during or after the second operating condition, shift a gear of the transmission depending on a desired speed of the engine at a subsequent third operating condition; and
        in response to the third operating condition, apply vehicle inertia to restart the engine by transferring wheel torque through the transmission to the at-rest engine to assist in spinning-up the engine from rest while the vehicle is traveling.

* * * * *